W. W. STANARD.
Refrigerator.
No. 29,415.
Patented July 31, 1860.
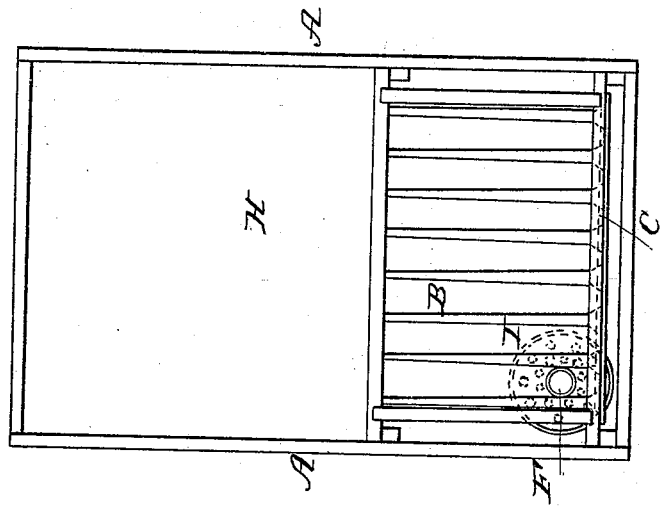
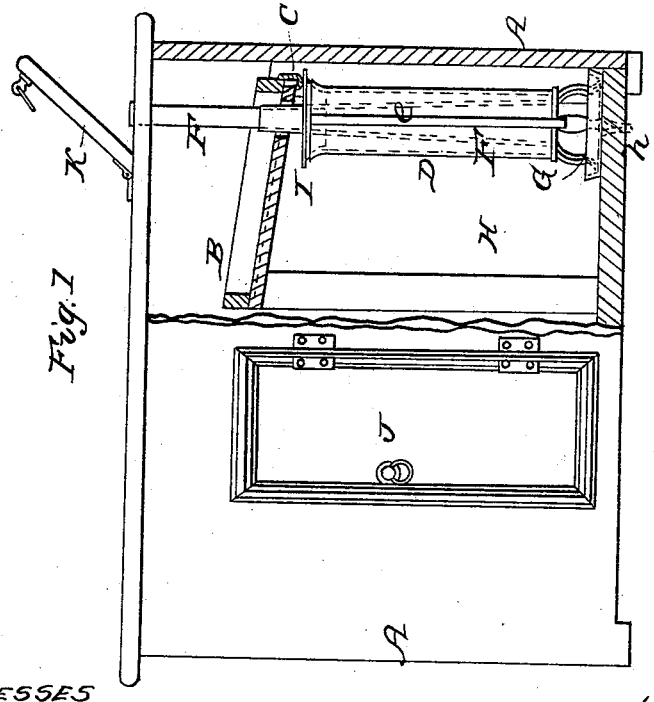
WITNESSES
INVENTOR

UNITED STATES PATENT OFFICE.

WALTER W. STANARD, OF BUFFALO, NEW YORK.

REFRIGERATOR.

Specification of Letters Patent No. 29,415, dated July 31, 1860.

*To all whom it may concern:*

Be it known that I, WALTER W. STANARD, of the city of Buffalo and State of New York, have invented certain new and useful Improvements in Refrigerators, the Principle of which is also Applicable to Curing-Houses, Preserving-Rooms, and the Like; and I do hereby declare that the following is a full and exact description thereof, reference being had to the accompanying drawings and to the letters of reference marked thereon.

Figure I is a side elevation and partial section of a refrigerator embracing the principle of my improvement. Fig. II is a plan of the same the cover being removed.

A, represents the main body of the refrigerator or preserving room, which may be made of single or double walls in a common manner.

B, represents the ice box, which is placed in the upper part of the preserving room in a slanting position so as quickly to conduct off the water which is formed by the melting ice. It is an open box or rack.

C, is a trough connected to the eaves of the ice box, which catches the water and conducts it to the water tank.

D, is a large water tank which receives the water as it runs from the ice. This is kept nearly full of cold ice water. It has a waste pipe as shown at e, which will carry off the surplus water and prevent the tank from overflowing.

F, represents an air tube which connects with the free external air, and passes down through or near the ice chamber, and into, and through, the tank, and opens into the preserving room H. This tube is made tapering or conical with its smaller end opening into the free air, and its larger end opening into the preserving room. It may however be made straight and answer a good purpose, but I prefer to make it tapering.

G, is a pan placed at the bottom of the tank, which catches the water, as it drips from the air tube F, as also the surplus water from the waste pipe, e, and is carried off through the pipe (h'.)

I, is a perforated basin which sets on the top of the tank. The air tube passes through this basin.

J, is a door which opens into the preserving room.

K, is a door in the top, which is shown as partly open. It is for purpose of convenient access to the ice box.

Operation: The water in the tank surrounds the air tube. This tube at the lower portion thereof becomes of the same, (or nearly the same,) temperature of the ice, and several degrees colder than the air in the upper portions of the preserving room. The air from without will consequently pass down this tube. In its passage down the tube, the moisture of the air becomes condensed, and collected upon the inner surface of the tube, and runs down the tube and drips into the pan, (G,). The air being thus deprived of its moisture and at the same time cooled, passes into the preserving room in a dry and cold state.

An appropriate register in the upper part of the preserving room will conduct off the warmer portions of the air, which rise to the upper part of the room. A circulation of cold dry air through the preserving room is thus kept up, with but a (comparatively) small expenditure of ice. When the external air is admitted directly upon the ice (as is the case in other refrigerators,) the moisture of the air, falling upon, and trickling down upon the ice causes a great and rapid melting of the ice, and hence will require one quarter, or one half more ice, than a refrigerator constructed upon the principle herein described.

The principle of my improvement prevents the external air from coming directly in contact with the ice, and more effectually dries and cools it, and may be operated with at least one quarter less ice, and at the same time produce a colder, drier, and more uniform temperature within the preserving room.

I claim—

The arrangement of the air tube, F, passing through or near the ice box B and through the water tank, D, and opening into the preserving room at its lower end, for the purposes, and substantially as set forth.

WALTER W. STANARD.

Witnesses:
E. B. FORBUSH,
E. M. DAVIS.